United States Patent
Helber et al.

(10) Patent No.: US 6,291,149 B1
(45) Date of Patent: Sep. 18, 2001

(54) AGGREGATED DYES FOR RADIATION-SENSITIVE ELEMENTS

(75) Inventors: Margaret Jones Helber, Rochester, NY (US); William James Harrison, Herts (GB); Elizabeth Ann Gallo, Rochester, NY (US); Mary Christine Brick, Webster, NY (US); Steven Wade Kortum, Rochester, NY (US); Gary Norman Barber, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/733,787

(22) Filed: Dec. 7, 2000

Related U.S. Application Data

(62) Division of application No. 08/565,480, filed on Nov. 30, 1995, now Pat. No. 6,183,944.

(51) Int. Cl.[7] ............................................. G03C 1/73
(52) U.S. Cl. ................................... 430/517; 430/522
(58) Field of Search .................................. 430/517, 522

(56) References Cited

U.S. PATENT DOCUMENTS

| | | | |
|---|---|---|---|
| 3,247,127 | 4/1966 | Bailey | 252/582 |
| 3,440,051 | 4/1969 | Bailey | 430/522 |
| 3,460,883 | 8/1969 | Lipp | 359/495 |
| 3,542,581 | 11/1970 | Graham et al. | 430/517 |
| 3,653,905 | 4/1972 | Depoorter et al. | 430/522 |
| 4,042,397 | 8/1977 | Moelants et al. | 430/522 |
| 4,078,933 | 3/1978 | Sugiyama et al. | 430/518 |
| 4,770,984 | 9/1988 | Ailliet et al. | 430/505 |
| 5,274,109 | 12/1993 | Texter | 548/365.4 |
| 5,326,687 | 7/1994 | Texter | 430/522 |
| 5,459,265 | 10/1995 | Wariishi | 544/300 |
| 5,922,523 | 7/1999 | Helber et al. | 430/517 |

*Primary Examiner*—Hoa Van Le
(74) *Attorney, Agent, or Firm*—Edith A. Rice

(57) ABSTRACT

A dispersion comprising an aqueous medium having dispersed therein an aggregated dye of the Formula (I):

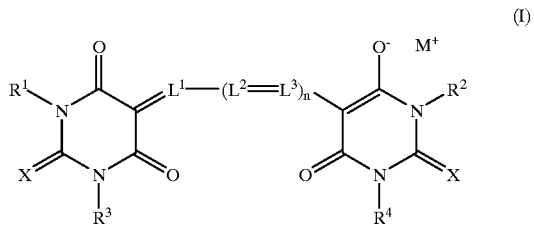

wherein X is oxygen or sulfur; $R^1$–$R^4$ each independently represent an unsubstituted or substituted alkyl group, an unsubstituted or substituted aryl group or an unsubstituted or substituted heteroaryl group; $L^1$, $L^2$ and $L^3$ each independently represent substituted or unsubstituted methine groups; $M^+$ represents a proton or an inorganic or organic cation; and n is 0, 1, 2 or 3 and wherein the aggregated dye in the dispersion has an absorption halfbandwidth of less than 55 nm.

6 Claims, No Drawings

AGGREGATED DYES FOR RADIATION-SENSITIVE ELEMENTS

CROSS-REFERENCE TO RELATED APPLICATION

This is a Divisional of application Ser. No. 08/565,480, filed Nov. 30, 1995, now U.S. Pat. No. 6,183,944.

FIELD OF THE INVENTION

This invention relates to a dispersion of an aggregated dye, a method for preparing said dispersion and a radiation-sensitive element containing said aggregated dye.

BACKGROUND OF THE INVENTION

Radiation-sensitive materials, including light-sensitive materials, such as photographic materials, may utilize filter dyes for a variety of purposes. Filter dyes may be used to adjust the speed of a radiation-sensitive layer; they may be used as absorber dyes to increase image sharpness of a radiation-sensitive layer; they may be used as antihalation dyes to reduce halation; they may be used to reduce the amount or intensity of radiation from reaching one or more radiation-sensitive layers, and they may also be used to prevent radiation of a specific wavelength or range of wavelengths from reaching one or more of the radiation-sensitive layers in a radiation-sensitive element. For each of these uses, the filter dye(s) may be located in any number of layers of a radiation-sensitive element, depending on the specific requirements of the element and the dye, and on the manner in which the element is to be exposed. The amount of filter dyes used varies widely, but they are preferably present in amounts sufficient to alter in some way the response of the element to radiation. Filter dyes may be located in a layer above a radiation-sensitive layer, in a radiation-sensitive layer, in a layer below a radiation-sensitive layer, or in a layer on the opposite side of the support from a radiation-sensitive layer.

Photographic materials often contain layers sensitized to different regions of the spectrum, such as red, blue, green, ultraviolet, infrared, X-ray, to name a few. A typical color photographic element contains a layer sensitized to each of the three primary regions of the visible spectrum, i.e., blue, green, and red. Silver halide used in these materials has an intrinsic sensitivity to blue light. Increased sensitivity to blue light, along with sensitivity to green light or red light, is imparted through the use of various sensitizing dyes adsorbed to the silver halide grains. Sensitized silver halide retains its intrinsic sensitivity to blue light.

There are numerous applications for which filtration or absorbance of very specific regions of light are highly desirable. Some of these applications, such as yellow filter dyes and magenta trimmer dyes, require non-diffusing dyes which may be coated in a layer specific manner to prevent specific wavelengths of light from reaching specific layers of the film during exposure. These dyes must have sharp-cutting bathochromic absorbance features on the bathochromic side to prevent light punch through without adversely affecting the speed of the underlying emulsions. Depending on the location of these filter layers relative to the sensitized silver halide emulsion layers, it would also be desirable to have non-diffusing, layer specific filter dyes with absorption spectra which are sharp-cutting on the hypsochromic edge as well as the bathochromic edge. Such dyes are sometimes known as "finger filters". Preferably these dyes should exhibit high extinction coefficients, narrow halfbandwidths and sharp cutting hypsochromic and bathochromic absorption envelopes when incorporated into photographic elements. Typically, to achieve these properties, solutions of dissolved, monomeric dyes (non-aggregated) have been incorporated. Dyes introduced by this method cannot be coated in a layer specific manner without the use of mordants, and therefore they often wander into adjacent layers and can cause problems such as speed loss or stain. Solubilized monomeric dyes may be mordanted to prevent wandering through adjacent layers. While the use of polymeric mordants can prevent dye wandering, such mordants aggravate the stain problem encountered when the dye remains in the element through processing.

Dyes with a high extinction coefficient allow maximum light absorption using a minimum amount of dye. Lower requisite dye laydown reduces the cost of light filtration and produces fewer processing by-products. Lower dye laydowns may also result in reduced dye stain in short duration processes.

Finger filters such as described above are highly desirable for other uses such as protecting silver halide sensitized emulsions from exposure by safelights. Such dyes must have absorbance spectra with high extinction coefficients and narrow halfbandwidths, and sharp cutting absorbance envelopes to efficiently absorb light in the narrow safelight-emitting region without adversely affecting the speed of the sensitized silver halide emulsions. This affords protection for the sensitized emulsion from exposure by light in the safelight's spectral region. Useful absorbance maxima for safelight dyes include, but are not restricted to 490 nm and 590 nm.

Similar properties are required for infrared absorbing filter dyes. Laser-exposed radiation-sensitive elements require high efficiency light absorbance at the wavelength of laser emission. Unwanted absorbance from broadly absorbing dyes reduces the efficiency of light capture at the laser emission wavelength, and requires the use of larger amounts of dye to adequately cover the desired spectral region. In photographic elements, unwanted absorbance may also cause speed losses in adjacent silver halide sensitized layers if the photographic element has multiple sensitized layers present. Useful finger filter absorbance maxima for absorbing laser and phosphor emissions include but are not restricted to 790 nm, 633 nm, 670 nm, 545 nm and 488 nm. [Laser ablation/non-photographic]

In some photographic elements it is necessary to provide light filtration or antihalation at deep cyan and infrared wavelengths. Typically such protection has been achieved using water soluble dyes or milled solid particle dyes. Typically, water soluble monomeric dyes can provide relatively sharp, high extinction absorbance, but are prone to interlayer wandering. Solid particle dispersions of typical cyan filter dyes are broad absorbing, see for example U.S. Pat. No. 4,770,984, and often weakly absorbing at 700 nm.

One common use for filter dyes is in silver halide light sensitive photographic elements. If, prior to processing, blue light reaches a layer containing silver halide which has been sensitized to a region of the spectrum other than blue, the silver halide grains exposed to the blue light, by virtue of their intrinsic sensitivity to blue light, would be rendered developable. This would result in a false rendition of the image information being recorded in the photographic element. It is therefore a common practice to include in the photographic element a material that filters blue light. This blue-absorbing material can be located anywhere in the element where it is desirable to filter blue light. In a color photographic element that has layers sensitized to each of the primary colors, it is common to have the blue-sensitized layer closest to the exposure source and to interpose a blue-absorbing, or yellow filter layer between the blue-sensitized layer and the green- and red-sensitized layers.

Another common use for filter dyes is to filter or trim portions of the UV, visible or infrared spectral regions to prevent unwanted wavelengths of light from reaching sensitized emulsions. Just as yellow filter dyes prevent false color rendition from the exposure of emulsions sensitized to a region of the spectrum other than blue, UV, magenta, cyan and infrared filter dyes can prevent false color rendition by shielding sensitized emulsion layers from exposure to specific wavelength regions. One application of this strategy is the use of green-absorbing magenta trimmer dyes. In one type of typical color photographic element containing a layer sensitized to each of the three primary regions of the visible spectrum, i.e., blue, green, and red, the green-sensitized layer is coated above the red-sensitized layer and below the blue-sensitized layer. Depending on the chosen spectral sensitivity maxima for the sensitized silver halide layers, there may be a region of overlap between the spectral sensitivities of the green and red emulsions. Under such circumstances, green light which is not absorbed by the green-sensitive emulsion can punch through to the red sensitive emulsion and be absorbed by the leading edge of the red spectral sensitizing dye. This crosstalk between the green and red emulsions results in false color rendition. It would, therefore, be highly desirable to find a green-absorbing filter dye which upon incorporation into a photographic element would absorb strongly around the spectral maximum of the green-sensitized emulsion, and possess a sharp cutting bathochromic absorbance such that there is no appreciable absorbance just bathochromic to its absorbance maximum. Though the position of optimal absorption maximum for a magenta trimmer dye will vary depending on the photographic element being constructed, it is particularly desirable in one type of typical color photographic element containing a layer sensitized to each of the three primary regions of the visible spectrum, i.e., blue, green, and red, that a magenta trimmer dye absorb strongly at about 550 nm, and possess a sharp cutting bathochromic absorbance such that there is no appreciable absorbance above about 550 nm. Therefore it would be desirable to provide a filter dye for use in photographic elements that possesses high requisite absorbance in the green region of the spectrum below about 550 nm, but little or no absorbance above about 550 nm, and furthermore does not suffer from incubative or post process stain problems, and furthermore is not prone to migration in the coated film, but is fully removed upon processing.

One method used to incorporate soluble monomeric filter dyes into photographic film element layers is to add them as aqueous or alcoholic solutions. Dyes introduced by this method are generally highly mobile and rapidly diffusing and often wander into other layers of the element, usually with deleterious results. While the use of polymeric mordants can prevent dye wandering, such mordants aggravate the stain problem encountered when the dye remains in the element through processing.

Filter dyes have also been prepared as conventional dispersions in aqueous gelatin using standard colloid milling or homogenization methods or as loaded latices. More recently, ball-milling, sand-milling, media-milling and related methods of producing fine particle size slurries and suspensions of filter dyes have become standard tools for producing slurries and dispersions that can readily be used in photographic melt formulations. Solid particulate filter dyes introduced as dispersions, when coated at sufficiently low pH, can eliminate problems associated with dye wandering. However, milled, insoluble solid particulate filter dyes provide relatively low absorption coefficients, requiring that an excessive amount of dye be coated. In addition, the time and expense involved in preparing serviceable solid particulate filter dye dispersions by milling techniques are a deterrent to their use, especially in large volume applications. It is therefore desirable to provide dye dispersions that do not necessarily require mechanical milling before use and that do not wander but that wash out easily during processing leaving little or no residual stain. It is also desirable that such filter dye dispersions provide high light absorption efficiencies with sharp-cutting absorbance peaks. One method of obtaining these desirable dye features in solid particulate dispersions of oxonol filter dyes was described by Texter (U.S. Pat. Nos. 5,274,109 and 5,326,687). Texter describes a process by which pyrazolone oxonol dyes are microprecipitated under strictly controlled pH conditions to produce absorbance spectra which are narrow, bathochromic and sharp cutting on the long wavelength side relative to their corresponding milled solid particulate dispersions. This technique, however, is impractical for large volume applications.

Problem to be Solved by the Invention

It is therefore desirable to have a filter dye which has a high extinction coefficient, narrow halfbandwidth, sharp cutting on both the hypsochromic and bathochromic edge, and capable of being substantially completely removed or rendered colorless on process of an exposed radiation-sensitive element comprising said dye. It is also desirable to have a method for preparing a dispersion of a filter dye that is suitable for high volume manufacture.

SUMMARY OF THE INVENTION

One object of this invention is to provide a filter dye which when dispersed and aggregated in a hydrophilic colloid such as gelatin, possesses a spectral absorbance maximum bathochromically shifted and exhibits an unusually high extinction coefficient and an exceptionally narrow halfbandwidth relative to its non-aggregated solution absorbance spectrum.

Another object of this invention is to provide a filter dye which when dispersed and aggregated in a hydrophilic colloid such as gelatin, possesses narrow absorption bands exhibiting an especially sharp-cutting absorbance envelope on the short and long wavelength edges.

Another object of this invention is to provide a filter dye which when dispersed and aggregated in a hydrophilic colloid such as gelatin, exhibits low dye diffusibility and interlayer wandering.

Another object of this invention is to provide a direct gelatin dispersion method allowing easy and reproducible incorporation of the inventive dyes in an aggregated state, with all desirable properties intact, into photographic elements without recourse to milling techniques.

Another object of this invention is to provide a filter dye which when dispersed and aggregated in a hydrophilic colloid such as gelatin exhibits excellent stability at high temperature and humidity conditions.

Another object of the invention is to provide a silver halide radiation-sensitive material containing at least one aggregated dye, incorporated in a hydrophilic colloid layer, which is decolorized irreversibly by photographic processing and which causes no deleterious effects on the silver halide photographic emulsions before or after processing.

A further object of the invention is to provide a silver halide radiation-sensitive material in which a hydrophilic colloid layer is dyed and exhibits excellent decolorizing properties upon photographic processing.

Yet another object of the invention is to provide a silver halide radiation-sensitive material in which a hydrophilic colloid layer is dyed and exhibits high absorbance in a portion of the spectral region at its absorbance maximum, but possesses comparatively little absorbance around 20 nm above its absorbance maximum.

Yet another object of the invention is to provide a silver halide radiation-sensitive material in which a hydrophilic colloid layer is dyed and exhibits high absorbance in a portion of the spectral region at its absorbance maximum, but possesses comparatively little absorbance around 20 nm below its absorbance maximum.

We have now discovered that certain dyes of Formula I, II and III, set forth below, aggregate when dispersed in an aqueous medium (preferably containing a hydrophilic colloid) and provide the advantages set for in the above objects of the invention. The said dye dispersion can be prepared by dispersing powdered dye or microcrystalline solid dye particles in an aqueous medium, preferably containing gelatin or other hydrophilic colloid, using the methods set forth herein.

One aspect of this invention comprises an aqueous dispersion comprising an aqueous medium having dispersed therein an aggregated dye of structural Formula I:

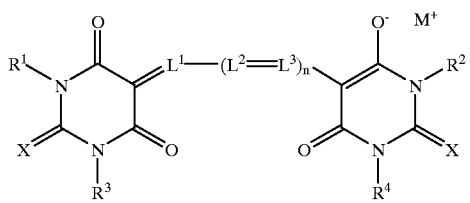

(I)

wherein X is oxygen or sulfur; $R^1$–$R^4$ each independently represent an unsubstituted or substituted alkyl group, an unsubstituted or substituted aryl group or an unsubstituted or substituted heteroaryl group; $L^1$, $L^2$ and $L^3$ each independently represent substituted or unsubstituted methine groups; $M^+$ represents a proton or an inorganic or organic cation; and n is 0, 1, 2 or 3 and wherein the aggregated dye in the dispersion has an absorption halfbandwidth of less than 55 nm.

In another preferred embodiment of the invention the aggregated dye of structural Formula I is of Formula II:

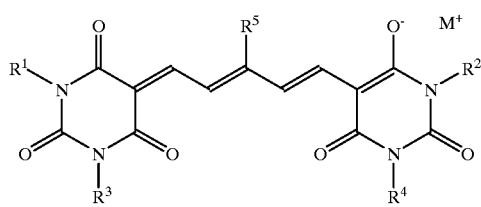

(II)

wherein $R^1$ to $R^4$ and $M^+$ are as defined above and $R^5$ represents a hydrogen atom or an unsubstituted or substituted alkyl, aryl or acyl group.

In yet another preferred embodiment of the invention the aggregated dye of structural Formula I is of Formula III:

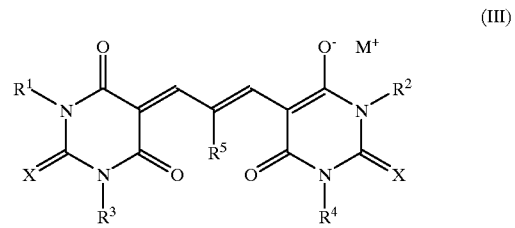

(III)

wherein $R^1$ to $R^4$, X, $M^+$ and $R^5$ are as defined above.

Still another preferred embodiment of the invention comprises a radiation-sensitive element, such as a photographic element, containing an aggregated dye of structural Formula I, II or III.

Yet another preferred embodiment of the invention comprises a method of preparing a dispersion which comprises adding a dye of structural Formula I, II or III to an aqueous medium at a temperature of from about 20 to about 100° C. and agitating the mixture for about 5 minutes to about 48 hours.

Advantageous Effects of the Invention

This invention provides a dye, useful as a filter dye in a radiation-sensitive element, such as a photographic element, which when dispersed in an aqueous medium, for example aqueous gelatin, dissolves then spontaneously aggregates. In some instances, the aggregated dye state constitutes an unusually well-ordered and thermodynamically stable liquid crystalline phase. A dye in the aggregated state possesses a coated $\lambda_{max}$ which is substantially bathochromic to that of its monomeric non-aggregated state and exhibits exceptionally high covering power at its coating $\lambda_{max}$. Further the aggregated dye exhibits sharp-cutting bathochromic and hypsochromic spectral features absorbing strongly at its coating $\lambda_{max}$ while absorbing comparatively little light at wavelengths just below or just above its absorbance maximum. Further, the aggregated dye possesses an unusually narrow halfbandwidth. The dyes can be formulated using methods for producing microcrystalline solid particle dye dispersions (SPD's), or as direct gelatin dispersions (DGD's) for incorporation in a photographic element. In such an environment, the spontaneously aggregated dyes exhibit little, if any tendency to wander within the element and upon processing are substantially free of post-process stain problems.

DETAILED DESCRIPTION OF THE INVENTION

As noted above, the dispersion of this invention comprises an aggregated dye of Formula I:

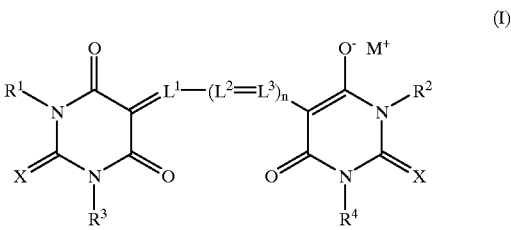

(I)

wherein X is oxygen or sulfur; $R^1$–$R^4$ each independently represent an unsubstituted or substituted alkyl group, an unsubstituted or substituted aryl group or an unsubstituted or substituted heteroaryl group; $L^1$, $L^2$ and $L^3$ each independently represent substituted or unsubstituted methine groups; $M^+$ represents a proton or an inorganic or organic cation; and n is 0, 1, 2 or 3 and wherein the aggregated dye in the dispersion has an absorption halfbandwidth of less than 55 nm.

In a preferred embodiment of the invention the aggregated dye of structural Formula I is of Formula II:

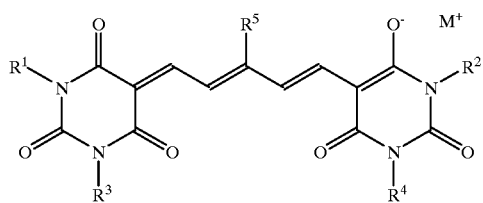

(II)

wherein $R^1$ to $R^4$ and $M^+$ are as defined above and $R^5$ represents a hydrogen atom or an unsubstituted or substituted alkyl, aryl or acyl group.

In yet another preferred embodiment of the invention the aggregated dye of structural Formula I is of Formula III:

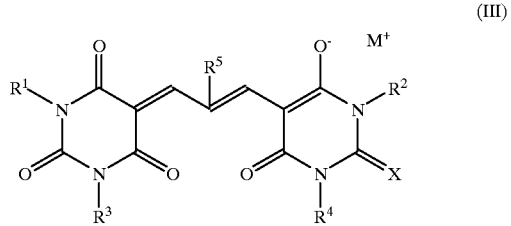

(III)

wherein $R^1$ to $R^4$, X and $M^+$ are as defined above.

In Formula (I), (II) and (III), illustrative alkyl groups preferably contain 1 to 6 carbon atoms and include methyl, ethyl, n-propyl, isopropyl, n-butyl, t-butyl, n-hexyl, and isohexyl. Examples of aryl groups include phenyl, naphthyl, anthracenyl, and styryl. Examples of substituted aryl groups include, for example, tolyl, m-chlorophenyl and p-methanesulfonylphenyl, etc. Examples of heteroaryl groups include pyridyl, thienyl, furyl, and pyrrolyl. Examples of acyl groups include ethoxycarbonyl, amido, benzoyl, carboxy and acetyl. $M^+$ is preferably H, Na, K, triethyl ammonium or pyridinium.

When reference in this application is made to a substituent "group", this means that the substituent may itself be substituted or unsubstituted (for example "alkyl group" refers to an unsubstituted or substituted alkyl). Generally, unless otherwise specifically stated, substituents on any "groups" referenced herein or where something is stated to be possibly substituted, include the possibility of any groups, whether substituted or unsubstituted, which do not destroy properties necessary for the photographic utility. For example, the filter dyes of this invention should not contain a substituent or combination of substituents, which render the dye too soluble at coating pH's, favoring a mobile monomeric dye species instead of the preferred aggregated dye species. It will also be understood throughout this application that reference to a compound of a particular general formula includes those compounds of other more specific formula which specific formula falls within the general formula definition.

Examples of substituents on any of the mentioned groups can include known substituents, such as: halogen, for example, chloro, fluoro, bromo, iodo; alkoxy, particularly those with 1 to 6 carbon atoms (for example, methoxy, ethoxy); substituted or unsubstituted alkyl, particularly lower alkyl (for example, methyl, trifluoromethyl); alkenyl or thioalkyl (for example, methylthio or ethylthio), particularly either of those with 1 to 6 carbon atoms; substituted and unsubstituted aryl, particularly those having from 6 to 20 carbon atoms (for example, phenyl, naphthyl, anthracenyl or styryl); and substituted or unsubstituted heteroaryl, particularly those having a 5 or 6-membered ring containing 1 to 3 heteroatoms selected from N, O, or S (for example, pyridyl, thienyl, furyl, pyrrolyl); and others known in the art. Alkyl substituents may specifically include "lower alkyl", that is having from 1 to 6 carbon atoms, for example, methyl, ethyl, and the like. Further, with regard to any alkyl group, alkylene group or alkenyl group, it will be understood that these can be branched or unbranched and include ring structures.

Examples of preferred dyes of this invention are listed below.

TABLE I

| Dye | $R^6$ | $R^7$ | $R^8$ | $R^9$ | $R^{10}$ | $R^{11}$ | $M^+$ |
|---|---|---|---|---|---|---|---|
| 1 | H | H | H | OMe | H | Me | H |
| 2 | H | H | Me | OH | H | H | H |
| 4 | H | H | H | H | OMe | Me | H |
| 4A | H | H | H | H | OMe | Me | Na |
| 5 | H | H | H | OH | H | Me | H |
| 7 | H | H | H | OMe | H | Et | H |
| 9 | H | H | H | H | OMe | H | H |
| 8A | H | H | H | H | OMe | H | TEAH |
| 9 | H | H | H | H | OH | H | H |
| 9A | H | H | H | H | OH | H | PyrH |
| 10 | H | H | H | OH | H | H | H |
| 11 | H | OMe | H | H | H | H | H |
| 10A | H | H | H | OH | H | H | PyrH |
| 10B | H | H | H | OH | H | H | TEAH |
| 12 | H | OMe | H | H | OMe | H | H |
| 14 | H | H | H | Me | H | Me | H |
| 15 | H | H | H | H | Me | H | H |
| 16 | H | H | H | H | OMe | Me | H |
| 17 | H | H | H | Me | H | $CONH_2$ | H |
| 18 | H | H | H | Cl | H | Me | H |
| 19 | H | H | H | CN | H | Me | H |
| 20 | H | H | H | $CONH_2$ | H | Et | H |
| 21 | H | H | H | Me | H | Et | TEAH |
| 22 | H | H | Me | H | H | Me | H |
| 23 | H | H | H | OMe | H | COPh | TEAH |
| 24 | H | H | H | COOH | H | Et | H |
| 25 | H | H | H | $NHSO_2Me$ | H | Me | H |
| 26 | H | H | OMe | H | OMe | Me | H |
| 27 | H | H | CN | H | CN | Me | H |
| 28 | H | H | Cl | H | H | Et | H |
| 29 | H | H | COOH | H | H | Me | H |
| 30 | H | OMe | OMe | H | H | Me | H |
| 31 | H | OMe | H | Me | H | Et | H |
| 32 | H | OMe | H | Me | H | $CONMe_2$ | H |
| 33 | H | H | Cl | OH | Cl | Et | H |
| 34 | H | CN | H | H | H | H | H |
| 35 | H | H | H | H | H | Me | H |

TABLE II

| Dye | R⁶ | R⁷ | R⁸ | R⁹ | R¹⁰ | R¹¹ | M⁺ |
|-----|----|----|----|----|-----|-----|----|
| 3   | H  | H  | OH | H  | H   | H   | H   |
| 3A  | H  | H  | OH | H  | H   | H   | PyrH |
| 6   | H  | H  | H  | OH | H   | H   | H   |
| 13  | H  | H  | H  | H  | H   | H   | H   |
| 13A | H  | H  | H  | H  | H   | H   | TEAH |
| 36  | H  | OH | H  | H  | H   | H   | TEAH |
| 37  | H  | H  | OH | OH | H   | H   | H   |
| 38  | H  | H  | H  | NHSO₂Me | H | H | TEAH |
| 39  | H  | H  | OH | Me | H   | H   | TEAH |

TABLE III

| Dye | R⁶ | R⁷ | R⁸ | R⁹ | R¹⁰ | R¹¹ | M⁺ |
|-----|----|----|----|----|-----|-----|----|
| 40  | H  | H  | H  | H  | H   | H   | TEAH |
| 41  | H  | H  | H  | Cl | H   | H   | TEAH |
| 42  | H  | H  | H  | Me | H   | H   | TEAH |
| 43  | H  | H  | H  | OH | H   | H   | TEAH |
| 44  | H  | H  | H  | NHCOCH₃ | H | H | TEAH |
| 45  | H  | H  | OMe | H | H   | H   | TEAH |
| 46  | H  | H  | OMe | H | H   | Me  | TEAH |

TABLE IV

DYE 47

DYE 48

DYE 49

DYE 50

DYE 51

DYE 52

DYE 53

TABLE IV-continued

DYE 54

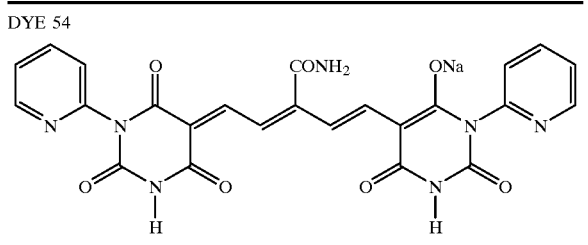

The dyes of Formulas (I), (II) and (III) can be prepared by synthetic techniques well-known in the art, as illustrated by the synthetic examples below. Such techniques are further illustrated, for example, in "The Cyanine Dyes and Related Compounds", Frances Hamer, Interscience Publishers, 1964.

The dispersions of this invention can be prepared in any of the ways known in the art (e.g., with the aid of a high-boiling non-polar organic solvent or in suitable water-miscible solvents such as methyl alcohol or dimethylformamide or the like), but are preferably formulated using methods developed for producing solid microcrystalline particles of dye (SPD's) or are more preferably formulated as direct gelatin dispersions (DGD's) as described herein.

A dispersion comprising solid microcrystalline particles of dye (SPD) can be prepared by known methods. Such methods includes forming a slurry of the dye in an aqueous medium comprising water and a surfactant and the subjecting the slurry to a milling procedure such as ball-milling, sand-milling, media-milling or colloid-milling (preferably media-milling). The SPD can then be added to an aqueous medium comprising water and a hydrophilic colloid, such as gelatin, for use in a photographic element.

In another preferred embodiment, the dyes may be formulated as a direct gelatin dispersion (DGD) wherein the finely powdered dye or aqueous slurry thereof is simply mixed or agitated with aqueous medium containing gelatin (or other hydrophilic colloid) at a temperature of 40° C. or higher. This method does not require the use of organic solvents, surfactants, polymer additives, milling processes, pH control or the like. It is simpler, faster, more forgiving and more flexible than prior processes.

In either of the preferred methods, the dyes may be subjected to elevated temperatures before and/or after gelatin dispersion, but to obtain desirable results, this heat treatment is carried out preferably after dispersing in gelatin. The optimal temperature range for preparing gelatin-based dispersions is 40° C.–100° C. but should remain below the decomposition points of the dyes. The heating time is not especially critical as long as the dyes are not decomposed, but in general it is in the range of 5 minutes to 48 hours. A similar heat treatment may be applied, if so desired, to dyes prepared as solid particle dispersions before and/or after dispersion in aqueous gelatin to obtain effective results. Furthermore, if so desired, pH and/or ionic strength adjustments may be utilized to control the solubility and aggregation properties of dyes prepared using SPD or DGD formulation techniques. The direct gelatin dispersion method is advantageous in that it does not necessarily require the use of organic solvents, surfactants, polymer additives, milling processes, pH control or the like. A related method described by Boettcher for preparing concentrated sensitizing dye dispersions in aqueous gelatin (PCT WO 93/23792) is equally effective when applied to the inventive dyes. The entire disclosure of WO 93/23792 is incorporated herein by reference.

Solid particle dispersion and direct gelatin dispersion formulations of the compound of Formula (I–III) are useful as general purpose filter dyes, alone or in combination with other filter dyes in photographic elements. The dyes formulated as described above possess finite but low solubilities and a pronounced tendency to aggregate spontaneously at coating pH's of 6 or less (generally 4–6) so that they do not interact with other components of the photographic element. However, they are highly soluble at processing pH's of 8 or more (generally 8–12), such that they are still fully removed during photographic processing.

A particular advantage of the inventive dyes is that in the aggregated state, they provide higher covering power at their coating $\lambda_{max}$ than comparable known dyes which are insoluble and exist as microcrystalline solid particles in the photographic medium. This advantage is particularly important in modern film formats and processing conditions, as filter dyes with high covering power need not be coated at as high a coverage as dyes with lower covering power in order to achieve the same degree of light filtration. In addition to reducing manufacturing costs, lower levels of coated dyes will reduce the level of dye residue built up in the processing solutions, and the resulting lower levels of dissolved dye residue removed from photographic elements will have reduced environmental impact.

A further advantage of dyes of the invention is that they generally possess absorbance envelopes that are sharper cutting on the bathochromic side than comparable known solid particle dyes such as the structural analogs disclosed in Agfa U.S. Pat. No. 4,770,984. This feature is especially advantageous when strong light absorbance is required in a spectral region up to a specific $\lambda_{max}$, and maximum light transmission is required past the specified $\lambda_{max}$. Such filter or trimmer dyes are especially useful when coated in specific layers of color photographic films to effectively prevent light of a specific wavelength region from exposing radiation-sensitive layers below the light filtration layer containing the dye, without causing unwanted absorption of longer wavelength radiation. A green filter dye coated directly above a red-sensitive silver halide layer is a particularly advantageous example of such absorbance features, and excellent green/red speed separation can be realized. In a typical color photographic element, it is desirable to have a green-absorbing filter dye which when coated absorbs strongly at wavelengths close to 550 nm, but which absorbs comparatively little at wavelengths greater than 550 nm. It should be emphasized that the exact envelope of desirable light absorbance for a filter dye, even specifically a green filter dye, varies tremendously from one photographic element to another depending on the intended purpose of the material. Some photographic elements might require a filter dye, such as a green filter dye, which absorbs strongly up to a wavelength somewhat shorter or longer than 550 nm, but is sharp cutting on the bathochromic side, mostly transmitting wavelengths of light past the desired absorbance $\lambda_{max}$. The feature of coated dye absorbance exhibiting a sharp cutting bathochromic and/or hypsochromic characteristic is fundamentally useful for wavelength-specific light filtration, though the exact wavelength of desired spectral shift from absorbance to transmission may be different for different photographic materials.

The dyes may be located in any layer of the element where it is desirable to absorb light, but in photographic elements it is particularly advantageous to locate them in a layer where they will be solubilized and washed out during processing. Useful amounts of dye range from 1 to 1000 mg/m². The dye should be present in an amount sufficient to yield an optical density at the absorbance $D_{max}$ in the spectral region of interest before processing of at least 0.10 density units and preferably at least 0.50 density units. This optical density will generally be less than 5.0 density units for most photographic applications.

The dyes of the invention can be used as interlayer dyes, trimmer dyes, or antihalation dyes. They can be used to prevent crossover in X-ray materials as disclosed in U.S. Pat. Nos. 4,900,652 and 4,803,150 and European Patent Application Publication No. 0 391 405, to prevent unwanted light from reaching a sensitive emulsion layer of a multi-color photographic element as disclosed in U.S. Pat No. 4,988,611, and for other uses as indicated by the absorbance spectrum of the particular dye. The dyes can be used in a separate filter layer or as an intergrain absorber.

The aggregated dyes of Formula (I–III) are useful for the preparation of radiation sensitive materials. Such materials are sensitive to radiation such as visible light, ultraviolet, infrared, X-ray. The material can be an optical recording medium, such as a CD or other medium sensitive to a laser, light emitting diode, or a more conventional light-sensitive photographic material.

Another aspect of this invention comprises a radiation sensitive element containing an aggregated dye of Formula (I–III). Preferably, the radiation sensitive element is a photographic element comprising a support bearing at least one light sensitive hydrophilic colloid layer and at least one other hydrophilic colloid layer. A dye of Formula I, II or III may be incorporated in a hydrophilic layer of the photographic element in any known way.

The support of the element of the invention can be any of a number of well-known supports for photographic elements as discussed more fully below.

The photographic elements made by the method of the present invention can be single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. Nos. 4,279,945 and 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to *Research Disclosure*, September 1994, Number 365, Item 36544, which will be identified hereafter by the term "*Research Disclosure I*." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

The silver halide emulsions employed in the photographic elements of the present invention may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g., to adjust levels of interlayer correction) and masking couplers such as those described in EP 213 490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. No. 4,163,669; 4,865,956; and 4,923,784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912,025); anti-fogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes and/or antihalation dyes (particularly in an undercoat beneath all light sensitive layers or in the side of the support opposite that on which all light sensitive layers are located) formulated either as oil-in-water dispersions, latex dispersions, solid particle dispersions, or as direct gelatin dispersions. Additionally, they may be used with "smearing" couplers (e.g., as described in U.S. 4,366,237; EP 096 570; U.S. Pat. Nos. 4,420,556; and 4,543,323.) Also, the couplers may be blocked or coated in protected form as described, for example, in Japanese Application 61/258,249 or U.S. Pat. No. 5,019,492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

It is also contemplated that the concepts of the present invention may be employed to obtain reflection color prints as described in *Research Disclosure*, November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906,559); with ballasted chelating agents such as those in U.S. Pat. No. 4,994,359 to reduce sensitivity to polyvalent cations such as calcium; and with stain reducing compounds such as described in U.S. Pat. Nos. 5,068,171 and 5,096,805. Other compounds useful in the elements of the invention are disclosed in Japanese Published Applications 83-09,959; 83-62,586; 90-072,629, 90-072,630; 90-072,632; 90-072,633; 90-072,634; 90-077,822; 90-078,229; 90-078,230; 90-079,336; 90-079,338; 90-079,690; 90-079,691; 90-080,487; 90-080,489; 90-080,490; 90-080,491; 90-080,492; 90-080,494; 90-085,928; 90-086,669; 90-086,670; 90-087,361; 90-087,362; 90-087,363; 90-087,364; 90-088,096; 90-088,097; 90-093,662; 90-093,663; 90-093,664; 90-093,665; 90-093,666; 90-093,668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like. For example, the silver halide used in the photographic elements of the present invention may contain at least 90% silver chloride or more (for example, at least 95%, 98%, 99% or 100% silver chloride). In the case of such high chloride silver halide emulsions, some silver bromide may be present but typically substantially no silver iodide. Substantially no silver iodide means the iodide concentration would be no more than 1%, and preferably less than 0.5 or 0.1%. In particular, in such a case the possibility is also contemplated that the silver chloride could be treated with a bromide source to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The type of silver halide grains preferably include polymorphic, cubic, and octahedral. The grain size of the silver halide may have any distribution known to be useful in photographic compositions, and may be either polydispersed or monodispersed.

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., ECD/t$^2$) >25 and ECD and t are both measured in micrometers ($\mu$m). The tabular grains can be of any thickness compatible with achieving an aim average aspect ratio and/or average tabularity of the tabular grain emulsion. Preferably the tabular grains satisfying projected area requirements are those having thicknesses of <0.3 $\mu$m, thin (<0.2 $\mu$m) tabular grains being specifically preferred and ultrathin (<0.07 $\mu$m) tabular grains being contemplated for maximum tabular grain performance enhancements. When the native blue absorption of iodohalide tabular grains is relied upon for blue speed, thicker tabular grains, typically up to 0.5 $\mu$m in thickness, are contemplated.

High iodide tabular grain emulsions are illustrated by House U.S. Pat. Nos. 4,490,458, Maskasky 4,459,353 and Yagi et al EPO 0 410 410.

Tabular grains formed of silver halide(s) that form a face centered cubic (rock salt type) crystal lattice structure can have either {100} or {111} major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I*, Section I.B. (3) (page 503).

The silver halide grains to be used in the invention may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as described in *Research Disclosure I*, Section IV (pages 510–511) and the references cited therein.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic elements of the present invention are preferably imagewise exposed using any of the known techniques, including those described in *Research Disclosure I*, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in *Research Disclosure I*, or in T. H. James, editor, *The Theory of the Photographic Process*, 4th Edition, Macmillan, N.Y., 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

4-amino N,N-diethylaniline hydrochloride,
4-amino-3-methyl-N,N-diethylaniline hydrochloride,
4-amino-3-methyl-N-ethyl-N-(β-(methanesulfonamido) ethylaniline sesquisulfate hydrate,
4-amino-3-methyl-N-ethyl-N-(β-hydroxyethyl)aniline sulfate,
4-amino-3-β-(methanesulfonamido)ethyl-N,N-diethylaniline hydrochloride and
4-amino-N-ethyl-N-(2-methoxyethyl)-m-toluidine di-p-toluene sulfonic acid.

Development is followed by bleach-fixing, to remove silver or silver halide, washing and drying.

Synthesis of Dye 1

3-methyl glutacondialdehydedianil hydrobromide (6.6 g, 19 mmol) was added portionwise to a solution of 4-methoxyphenylbarbituric acid (9.6 g, 41 mmol) in 150 mL pyridine at 80° C. The blue mixture was heated at 80° C. for 30 min, then allowed to cool to 25° C. The precipitated dye was collected by filtration and washed with acetonitrile. The collected solid was suspended in 300 ml, methanol and stirred while 100 mL concentrated HCl was added over 10 min, and the resulting slurry was allowed to stir at 25° C. for 30 min. The dye was collected by filtration and dried. Isolated 6.2 g (46%) of Dye 1 as a black solid. All analytical data were consistent with the structure.

Synthesis of Dye 8

Glutacondialdehydedianil hydrochloride (7.3 g, 26 mmol) was added portionwise to a solution of 3-methoxyphenylbarbituric acid (12.0 g, 51 mmol) and triethylamine (7.8 g, 77 mmol) in 300 mL ethanol at 25° C. The mixture was heated to reflux and held for 30 min. A blue solid precipitated from the hot reaction mixture. The mixture was then allowed to cool to 25° C., and the precipitated dye was collected by filtration and washed with ethanol. The collected solid was suspended in 250 mL ethanol and heated to reflux while 3 mL concentrated HCl was added over 5 min. The resulting slurry was heated at reflux for 10 min, then allowed to cool to 25° C. The dye was collected by filtration, washed with methanol and dried. Isolated 11.3 g (84%) of Dye 8 as a dark solid. All analytical data were consistent with the structure.

EXPERIMENTAL EXAMPLES

Example A

Microcrystalline Dye Slurry (MDS) Formulation

Dyes were formulated as aqueous microcrystalline dispersions of 0.2 microns mean particle size by ball-milling according to the following procedure. Water (22.0 g) and a 10.0% solution of Triton X-200®, an alkyl aryl polyether sulfonate surfactant available from Rohm and Haas, (1.0 g) were placed in a 120 mL screw-capped bottle. A 1.0 g sample of dye was added to this solution. Zirconium oxide beads (60 mL, 1.8 mm diameter) were added and the container with the cap tightly secured was placed in a mill and the contents milled for four days. The resulting mixture was then filtered to remove the zirconium oxide beads. The resulting aqueous microcrystalline dye slurries will be referred to in the following examples as MDS's.

Example B

Solid Particle Dispersion (SPD) Formulation

Aqueous gelatin dispersions of the above MDS's were prepared as follows. The vessel containing the dye MDS was removed and the requisite weight of dye slurry was added to a 12.5% aqueous gelatin solution (18.0 g) at 45° C. This mixture was then diluted with water to a weight of 88.87 g., yielding the final dye dispersion. In the subsequent experimental sections gelatin-containing dye dispersions prepared in this manner will be referred to as solid particle dispersions (SPD's). The term "SPD" is used throughout simply to denote dye dispersions which have been formulated using well known milling techniques normally used for preparing solid particle microcrystalline dye dispersions. This does not imply that the physical state of the dye prepared in this manner is exclusively microcrystalline in nature.

Example C

Direct Gelatin Dispersion (DGD) Formulation

Nominally 1.42500 g $H_2O$ then 0.07500 g deionized gelatin were weighed into screw-topped glass vials and allowed to soak at 25° C. for at least 30 minutes. The swollen gelatin was then melted at 50° C. for 15 minutes with agitation. The gelatin solution was cooled to 25° C., then refrigerated at 5° C. to set. Nominally 1.49700 g $H_2O$ was then added on top of the set gelatin followed by 0.00300 g of powdered dye. The dye powder was thoroughly wetted and dispersed in the water layer by agitation and then allowed to stand at 25° C. for 17 hours. The samples were then heated to 60° C. in a water bath for 2 hours and mixed with intermittent agitation. The samples were subsequently cooled to 39.0° C. over a period of approximately 1 hour and maintained at this temperature until measurement. In the subsequent experimental sections dispersions prepared in this manner will be referred to as DGD's.

Example 1

Absorption Wavelength ($\lambda_{max}$), Halfbandwidth (Hbw) and Molar Extinction Coefficients ($\epsilon_{max}$) of Wet Dye DGD's Direct gelatin dispersions (DGD's) of Dyes 1–16 and Comparative Dyes A–D were prepared as described in Example C. Aliquots of each dispersion, held at 39° C., were transferred to 0.0032 cm pathlength glass cells and their absorption spectra measured at 25° C. Solutions of Dyes 1–16 and Comparative Dyes A–D were prepared in a suitable organic solvent (methanol or methanol with added triethylamine unless otherwise noted) and their absorption spectra measured at 25° C. The extinction coefficients were calculated according to Beer's Law, and halfbandwidths (Hbw) measured. The data are summarized in Table V.

TABLE V

| Dye | $\lambda_{max}$ soln. (nm) | $\epsilon_{max}$ soln. (mol$^{-1}$ l cm$^{-1}$) x10$^5$ | Hbw soln. (nm) | $\lambda_{max}$ DGD (nm) | $\epsilon_{max}$ DGD (mol$^{-1}$ l cm$^{-1}$) x10$^5$ | Hbw DGD (nm) |
|---|---|---|---|---|---|---|
| 1 | 611 | 1.81 | 34 | 793 | 8.19 | 18 |
| 2 | 587 | 1.92 | 38 | 738 | 6.97 | 19 |
| 3 | 488 | 1.12 | 29 | 558 | 5.18 | 12 |
| 3A | 488 | 1.15 | 29 | 558 | 5.82 | 12 |
| 4 | 609 | 1.63 | 38 | 779 | 2.93 | 24 |
| 4A | 609 | 1.60 | 38 | 778 | 3.89 | 16 |
| 5 | 609 | 1.42 | 38 | 790 | 5.29 | 19 |
| 6 | 488 | 1.32 | 30 | 555 | 3.59 | 17 |
| 7 | 615 | 1.69 | 35 | 785 | 2.82 | 17 |
| 8 | 586 | 1.71 | 39 | 721 | 3.58 | 40 |
| 8A | 586 | 1.73 | 39 | 721 | 3.89 | 42 |
| 9 | 587 | 1.48 | 36 | 739 | 3.22 | 35 |
| 9A | 587 | 1.48 | 36 | 740 | 4.96 | 37 |
| 10 | 587 | 1.86 | 36 | 717 | 4.01 | 46 |
| 10A | 587 | 1.86 | 36 | 762 | 2.42 | 50 |
| 10B | 587 | 1.86 | 36 | 717 | 3.54 | 46 |
| 11 | 586 | 1.79 | 39 | 755 | 2.45 | 30 |
| 12 | 586 | 2.25 | 35 | 758 | 2.83 | 29 |
| 13 | 586 | 1.95 | 36 | 554 | 1.88 | 15 |
| 13A | 586 | 1.95 | 36 | 549 | 1.79 | 18 |
| 14 | 609 | 1.86 | 38 | 792 | 6.74 | 20 |
| 15 | 586 | 1.90 | 39 | 723 | 3.02 | 41 |
| 16 | 611 | 2.01 | 35 | 771 | 6.55 | 48 |
| A | 586 | 1.69 | 39 | 682 | 1.56 | 75 |
| Aa | 586 | 1.70 | 39 | 686 | 1.44 | 75 |
| B | 586 | 1.95 | 37 | 709 | 2.10 | 58 |
| C | 587 | 1.76 | 39 | 586 | 0.77 | 121 |
| D | 587 | 2.10 | 36 | 682 | 1.56 | 77 |

The above results demonstrate that the direct gelatin dispersions containing the inventive dyes in an aggregated state exhibit bathochromically shifted longer wavelength absorption maxima relative to their solution (non-aggregated) absorption maxima. Moreover, the inventive aggregated dyes as DOD's are comparable or superior in both Hbw and extinction coefficient to their solution (non-aggregated) counterparts. Moreover, as DGD's the inventive dyes are far superior in both Hbw and extinction coefficient to the comparative dyes A to D.

| COMPARATIVE DYES | |
|---|---|
| Comparative Dye A | 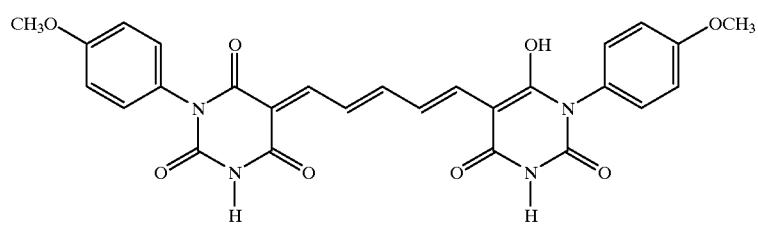 |
| Comparative Dye Aa | 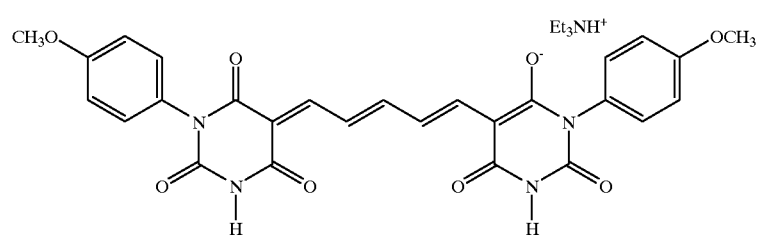 |
| Comparative Dye B | 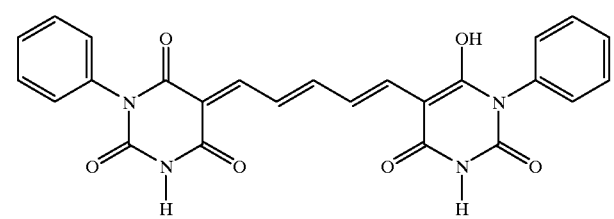 |
| Comparative Dye C | 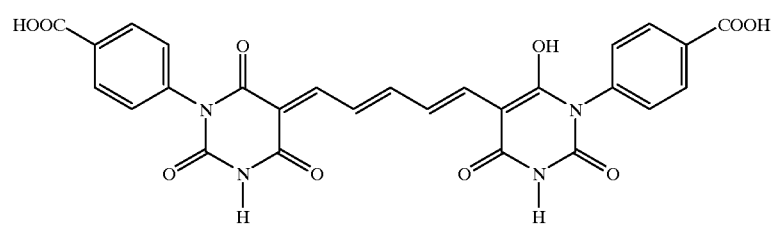 |
| Comparative Dye D | 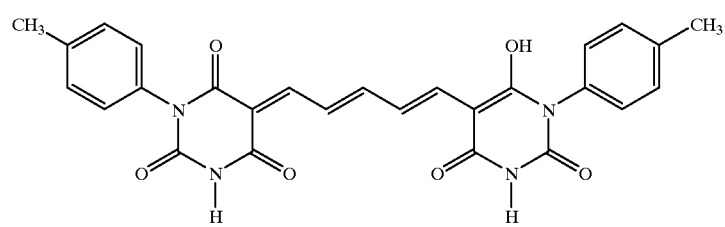 |

Example 2

Spectral Shape of Wet Dye DGD's

Direct gelatin dispersions (DGD's) of Dyes 1–16 and Comparative Dyes A–D were prepared as described in Example C. Aliquots of each dispersion, held at 39° C., were transferred to 0.0032 cm pathlength glass cells and their absorption spectra measured at 25° C. as wet gelatin films. The ratio of each dye's optical density at $\lambda_{max}$ ($D_{max}$) to optical density (O.D.) at $\lambda_{max}$+20 nm was calculated. The ratio of each dye's optical density at $\lambda_{max}$ ($D_{max}$) to optical density (O.D.) at $\lambda_{max}$−20 nm was also calculated. These ratios are a measure of spectral band sharpness. Dyes with higher ratios possess sharper cutting spectral absorption envelopes which are desirable for light filtration/absorption applications. The data are summarized in Table VI.

TABLE VI

| Dye | $\lambda_{max}$ DGD$_{wet}$(nm) | $D_{max}$/O.D. at $\lambda_{max}$ + 20 nm | $D_{max}$/O.D. at $\lambda_{max}$ − 20 nm |
|---|---|---|---|
| 1 | 794 | 20.3 | 3.43 |
| 2 | 738 | 27.2 | 2.98 |
| 3 | 558 | 321 | 5.83 |
| 3A | 558 | 158 | 6.70 |
| 4 | 788 | 4.81 | 2.48 |
| 4A | 788 | 15.0 | 4.14 |
| 5 | 790 | 21.9 | 3.69 |
| 6 | 554 | 68.5 | 3.61 |
| 7 | 782 | 20.9 | 3.74 |
| 8 | 722 | 2.48 | 1.78 |

TABLE VI-continued

| Dye | $\lambda_{max}$ DGD$_{wet}$(nm) | $D_{max}$/O.D. at $\lambda_{max}$ + 20 nm | $D_{max}$/O.D. at $\lambda_{max}$ − 20 nm |
|---|---|---|---|
| 8A | 722 | 2.50 | 2.00 |
| 9 | 738 | 3.20 | 2.09 |
| 9A | 740 | 2.87 | 1.97 |
| 10 | 717 | 2.32 | 1.55 |
| 10A | 762 | 2.18 | 1.48 |
| 10B | 716 | 2.24 | 1.62 |
| 11 | 750 | 3.31 | 2.05 |
| 12 | 759 | 6.06 | 2.24 |
| 13 | 554 | 31.5 | 3.79 |
| 13A | 549 | 30.9 | 3.22 |
| 14 | 792 | 7.29 | 3.68 |
| 15 | 722 | 2.47 | 1.77 |
| 16 | 774 | 10.2 | 1.67 |
| A | 682 | 1.39 | 1.17 |
| Aa | 684 | 1.53 | 1.24 |
| B | 710 | 1.96 | 1.25 |
| C | 586 | 1.48 | 1.43 |
| D | 682 | 1.50 | 1.19 |

The data clearly demonstrate that the inventive dyes 1–16 when aggregated in aqueous gelatin possess absorption spectra with significantly sharper hypsochromic and bathochromic edges relative to the comparative dyes A to D. Moreover, these useful spectral features are largely retained in dried-down gelatin films and layers.

Example 3

Spectral Properties of Wet Gelatin Layers Containing Dyes Added in the Powdered or Microcrystalline State Each of Dyes 1, 3, 8, 10, 11, 15 and Comparative Dyes A and D in the powdered state were dispersed directly in aqueous gelatin as described in Example C. The same dyes, formulated as aqueous microcrystalline dye dispersions (MDS's) in accordance with Example A, were also dispersed in aqueous gelatin at comparable concentrations under identical conditions. Solution aliquots of each dye dispersion were transferred to 0.0032 cm pathlength glass cells and their absorption maxima measured at 25° C. as wet gelatin films. The corresponding extinction coefficients ($\epsilon_{max}$) were calculated using Beer's law, and halfbandwidths (Hbw) measured. The data are compared in Table VII, where the qualifers "powder" and "MDS" denote the original physical state of the dye before mixing with gelatin.

TABLE VII

| Dye | $\lambda_{max}$ powder (nm) | $\lambda_{max}$ MDS (nm) | Hbw powder (nm) | Hbw MDS (nm) | $\epsilon_{max}$ powder (mol$^{-1}$l cm$^{-1}$) x10$^5$ | $\epsilon_{max}$ MDS (mol$^{-1}$l cm$^{-1}$) x10$^5$ |
|---|---|---|---|---|---|---|
| 1 | 793 | 793 | 18 | 18 | 8.19 | 4.63 |
| 3 | 558 | 558 | 12 | 13 | 5.18 | 3.80 |
| 8 | 721 | 721 | 40 | 41 | 3.58 | 4.14 |
| 10 | 717 | 715 | 46 | 48 | 4.01 | 1.99 |
| 11 | 755 | 755 | 30 | 30 | 2.45 | 2.37 |
| 15 | 723 | 724 | 41 | 41 | 3.02 | 2.36 |
| A | 682 | 680 | 75 | 80 | 1.56 | 1.39 |
| D | 682 | 681 | 77 | 80 | 1.56 | 1.24 |

The above data demonstrate that excellent results may be obtained from wet aqueous gelatin dispersions containing the inventive dyes added in either the powdered or ball-milled microcrystalline state. It is clearly not essential, however, to resort to the preparative complexities of dye milling in order to achieve the desired spectral properties.

Example 4

Spectral Properties of Wet and Dried Dye DGD's

Direct gelatin dispersions (DGD's) of Dyes 1–16 and Comparative Dyes A–D were prepared using powdered dye as described in Example C. Aliquots of each dispersion, held at 39° C., were transferred to 0.0032 cm pathlength glass cells and their absorption spectra measured immediately at 25° C. These samples are referred to in Table VIII as "wet DGD's". Solution aliquots of each dispersion were also smeared onto standard glass microscope slides (0.8/1.0 mm thickness) to form uniformly thin wet films which were allowed to dry at ambient temperature and humidity for at least 17 hours such that their $D_{max}$ (dried) was less than 4.0 absorbance units. The absorption spectra for these dried gelatin films were then measured at 25° C. These samples are referred to in Table VIII as "dry DGD's". The data are summarized in Table VIII.

TABLE VIII

| Dye | $\lambda_{max}$ DGD$_{wet}$ (nm) | $\lambda_{max}$ DGD$_{dry}$ (nm) | Hbw Wet (nm) | Hbw Dry (nm) |
|---|---|---|---|---|
| 1 | 793 | 794 | 18 | 22 |
| 2 | 738 | 737 | 19 | 35 |
| 3 | 555 | 559 | 12 | 14 |
| 3A | 559 | 560 | 12 | 14 |
| 4 | 779 | 781 | 24 | 35 |
| 4A | 778 | 780 | 16 | 22 |
| 5 | 790 | 791 | 19 | 30 |
| 6 | 555 | 557 | 17 | 19 |
| 7 | 785 | 788 | 17 | 21 |
| 8 | 721 | 719 | 40 | 44 |
| 8A | 721 | 722 | 42 | 50 |
| 9 | 739 | 739 | 35 | 40 |
| 9A | 740 | 739 | 37 | 44 |
| 10 | 717 | 713 | 46 | 54 |
| 10A | 762 | 772 | 50 | 52 |
| 10B | 717 | 712 | 46 | 53 |
| 11 | 751 | 757 | 34 | 49 |
| 12 | 758 | 763 | 29 | 44 |
| 13 | 554 | 554 | 15 | 21 |
| 13A | 549 | 553 | 18 | 20 |
| 14 | 792 | 794 | 20 | 23 |
| 15 | 723 | 724 | 41 | 45 |
| 16 | 771 | 771 | 48 | 59 |
| A | 682 | 684 | 75 | 82 |
| Aa | 686 | 686 | 75 | 85 |
| B | 709 | 709 | 58 | 64 |
| C | 586 | 602 | 121 | 178 |
| D | 682 | 684 | 77 | 81 |

The above results clearly demonstrate that the useful spectral features of bathochromic absorbance maximum, narrow Hbw and high extinction coefficient for each inventive dye aggregated in wet aqueous gelatin, are largely retained in dried gelatin films or layers.

Example 5

Spectral Properties of Dried Gelatin Layers Containing Dyes Formulated Using DGD and SPD Procedures Direct gelatin dispersions of the Inventive Dyes 2, 6, 8, 9, 11 and 15 were prepared as described in Example C at concentrations equivalent to dye laydowns of 0.064 mg/m$^2$. Solution aliquots of each dispersion were smeared onto glass microscope slides (0.8/1.0 mm thickness) to form uniformly thin wet films which were then allowed to dry at ambient temperature and humidity for at least 17 hours. The absorption spectra for these dried films were then measured at 25°

C. These samples are referred to in Table IX as "dry DGD's". The inventive Dyes 2, 6, 8, 9, 11 and 15 were also dispersed in aqueous gelatin according to the SPD procedure described in Example B. These SPD's were coated on a polyester support according to the following procedure. A spreading agent (Olin 10G, an isononylphenoxy glycidol surfactand available from Olin Corp.) and a hardener (bis(vinylsulfonylmethyl)ether) were added to the dye-gelatin melt prepared as described above. A melt from this mixture was then coated on a poly(ethylene terephthalate) support to achieve a dye coverage of 0.064 g/m$^2$, a gelatin coverage of 1.61 g/m$^2$, and a hardener level of 0.016 g/m$^2$. The absorption spectrum of the dried SPD coating was measured at 25° C. The data are summarized in Table IX.

TABLE IX

| Dye | $\lambda_{max}$ DGD$_{dry}$ (nm) | Hbw DGD$_{dry}$ (nm) | $\lambda_{max}$ SPD dry$_{(nm)}$ | Hbw SPD$_{dry}$ (nm) |
|---|---|---|---|---|
| 2 | 737 | 35 | 733 | 33 |
| 6 | 557 | 19 | 558 | 26 |
| 8 | 719 | 44 | 720 | 47 |
| 9 | 739 | 40 | 735 | 58 |
| 11 | 757 | 49 | 751 | 51 |
| 13 | 554 | 21 | 552 | 25 |
| 13A | 553 | 20 | 552 | 25 |
| 15 | 724 | 45 | 719 | 48 |

The data show no significant differences in $\lambda_{max}$ or Hbw for the dried gelatin films containing aggregated dyes formulated according to the DGD or SPD procedures outlined in Examples C and B, respectively.

Example 6

Process Removability of Dyes

The inventive Dyes 1–3, 5, 7–11, and 14–15 were formulated according to the SPD procedure described in Example B. These dye dispersions were coated on a polyester support according to the following procedure. A spreading agent (surfactant 10G) and a hardener (bis(vinylsulfonylmethyl)ether) were added to the dye-gelatin melt prepared as described above. A melt from this mixture was then coated on a poly(ethylene terephthalate) support to achieve a dye coverage of 0.161 g/m$^2$, a gelatin coverage of 1.61 g/m$^2$, and a hardener level of 0.016 g/m$^2$. The absorption spectrum of the dried SPD coating was measured at 25° C. Identical elements were subjected to Kodak E-6® processing (which is described in *British Journal of Photography Annual*, 1977, pp. 194–97) and the absorbance was measured for each. The results are shown in Table X.

TABLE X

| Dye | $\lambda_{max}$SPD$_{dry}$ (nm) | D$_{max}$ | D$_{max}$ after E-6 Processing |
|---|---|---|---|
| 1 | 790 | >4.0 | 0.0 |
| 2 | 733 | >4.0 | 0.0 |
| 3 | 558 | 2.3 | 0.0 |
| 5 | 758 | >4.0 | 0.0 |
| 7 | 778 | 3.6 | 0.0 |
| 8 | 720 | 2.5 | 0.0 |
| 9 | 735 | 3.3 | 0.0 |
| 10 | 705 | 3.1 | 0.0 |
| 11 | 751 | >4.0 | 0.0 |
| 13 | 552 | 1.6 | 0.0 |
| 13A | 552 | 1.3 | 0.0 |

TABLE X-continued

| Dye | $\lambda_{max}$SPD$_{dry}$ (nm) | D$_{max}$ | D$_{max}$ after E-6 Processing |
|---|---|---|---|
| 14 | 784 | >4.0 | 0.0 |
| 15 | 721 | >4.0 | 0.0 |

In spite of the inordinately high optical densities (D$_{max's}$) for the aggregated coated dyes, no residual deleterious dye stain (optical density) could be detected after processing.

Example 7

Dye Immobility and Thermal Stability

The inventive Dyes 1, 3, 9, 10 and 15 were formulated using the SPD procedure described in Example B and coated on a polyester support as outlined in Example 6. Each dye was coated at a laydown such that the measured D$_{max}$ was less than 3.5. For each example, the absorbance spectrum for the dyed gelatin coating was measured both before and after incubation for seven days at 120° C./50% relative humidity. The results are summarized in Table XI.

TABLE XI

| Dye | Dye laydown (g/m$^2$) | $\lambda_{max}$SPD (nm) | D$_{max}$ SPD before incubation | D$_{max}$ SPD after incubation |
|---|---|---|---|---|
| 1 | 0.043 | 790 | 3.3 | 3.5 |
| 3 | 0.043 | 558 | 2.3 | 2.3 |
| 9 | 0.161 | 735 | 3.3 | 3.4 |
| 10 | 0.161 | 705 | 3.2 | 3.2 |
| 13 | 0.043 | 552 | 1.6 | 1.7 |
| 13A | 0.043 | 552 | 1.3 | 1.4 |
| 15 | 0.043 | 721 | 1.7 | 1.7 |

It is clear from the data that the aggregated dyes in the inventive examples show an excellent robustness toward high heat and humidity as evidenced by the fact that little or no density loss at the aggregate $\lambda_{max}$ is observed as a result of incubation. Furthermore, the absence of any detectable optical density at the monomeric $\lambda_{max}$ of the inventive dyes following incubation demonstrates that little or no mobile monomeric dye species is produced under these conditions. Consequently, the aggregated inventive dyes exhibit excellent robustness and fastness to diffusion at high temperature and humidity.

The invention has been described in detail with particular reference to preferred embodiments, but it will be understood that variations and modifications can be effected within the spirit and scope of the invention.

What is claimed is:

1. A photographic element comprising at least one light sensitive layer and at least one light insensitive layer and containing a dye of the Formula:

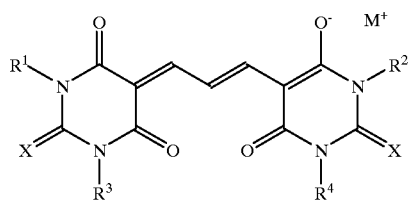

wherein X is oxygen or sulfur; R$^1$–R$^4$ each independently represent a hydrogen atom or an unsubstituted or substituted alkyl group, an unsubstituted or substituted aryl group or an unsubstituted or substituted heteroaryl group; and $M^+$ represents a proton; and wherein the dye is in aggregated form and in aggregated form in an aqueous hydrophilic colloid medium has an absorption halfbandwidth of less than 55 nm.

2. A photographic element in accordance with claim 1, wherein each of $R^1$ and $R^2$ is independently an unsubstituted or substituted alkyl, aryl or heteroaryl group.

3. A photographic element in accordance with claim 2, wherein, each of $R^1$ and $R^2$ is independently an unsubstituted or substituted phenyl group.

4. A photographic element in accordance with claim 1, wherein each of $R^3$ and $R^4$ is a hydrogen atom.

5. A photographic element in accordance with claim 1, wherein the dye is in the light insensitive layer and said layer comprises a hydrophilic colloid.

6. A photographic element in accordance with claim 5, wherein the hydrophilic colloid is gelatin.

* * * * *